(12) United States Patent
Mei et al.

(10) Patent No.: US 7,688,540 B1
(45) Date of Patent: Mar. 30, 2010

(54) DISK DRIVE SELECTING TPI PROFILE BY ESTIMATING HEAD GEOMETRY

(75) Inventors: Lin Mei, San Jose, CA (US); Xiaokun L. Chew, San Juan Capistrano, CA (US); Teik EE Yeo, Trabuco Canyon, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 1 day.

(21) Appl. No.: 11/957,616

(22) Filed: Dec. 17, 2007

(51) Int. Cl.
*G11B 20/20* (2006.01)

(52) U.S. Cl. .............................. 360/76; 360/31; 360/75

(58) Field of Classification Search ........................ None
See application file for complete search history.

(56) References Cited

U.S. PATENT DOCUMENTS

| | | | |
|---|---|---|---|
| 4,945,427 A | 7/1990 | Cunningham | |
| 5,596,458 A | 1/1997 | Emo et al. | |
| 5,739,994 A | 4/1998 | Ottesen et al. | |
| 5,812,755 A | 9/1998 | Kool et al. | |
| 5,870,237 A | 2/1999 | Emo et al. | |
| 5,930,069 A | 7/1999 | Kim | |
| 5,940,237 A | 8/1999 | Takagi | |
| 5,949,603 A | 9/1999 | Brown et al. | |
| 5,956,196 A | 9/1999 | Hull et al. | |
| 6,005,725 A | 12/1999 | Emo et al. | |
| 6,052,250 A | 4/2000 | Golowka et al. | |
| 6,084,738 A | 7/2000 | Duffy | |
| 6,091,559 A | 7/2000 | Emo et al. | |
| 6,105,104 A | 8/2000 | Guttmann et al. | |
| 6,118,604 A | 9/2000 | Duffy | |
| 6,130,796 A | 10/2000 | Wiselogel | |
| 6,137,644 A | 10/2000 | Hetzler et al. | |
| 6,172,839 B1 | 1/2001 | Ahn | |
| 6,182,250 B1 | 1/2001 | Ng et al. | |
| 6,195,218 B1 | 2/2001 | Guttmann et al. | |
| 6,256,160 B1 | 7/2001 | Liikanen et al. | |
| 6,262,857 B1 | 7/2001 | Hull et al. | |
| 6,317,285 B1 | 11/2001 | Bi et al. | |
| 6,396,654 B2 | 5/2002 | Jeong et al. | |
| 6,441,981 B1 | 8/2002 | Cloke et al. | |
| 6,466,387 B1 | 10/2002 | Ogasawara et al. | |
| 6,493,176 B1 | 12/2002 | Deng et al. | |
| 6,560,052 B2 | 5/2003 | Ng et al. | |
| 6,751,036 B2 | 6/2004 | Quak et al. | |
| 6,765,737 B1 | 7/2004 | Lim et al. | |
| 6,765,744 B2 | 7/2004 | Gomez et al. | |
| 6,778,343 B2 | 8/2004 | Nunnelley | |
| 6,943,972 B1 | 9/2005 | Chue et al. | |
| 6,950,256 B2 | 9/2005 | Kadokawa | |
| 6,956,710 B2 | 10/2005 | Yun et al. | |
| 6,969,989 B1 | 11/2005 | Mei | |

(Continued)

*Primary Examiner*—Jason C Olson (57) ABSTRACT

A disk drive is disclosed comprising a disk and a head actuated radially over the disk. The head is positioned over a first radial location, and a first data tracks per inch (TPI_1) is selected for data tracks recorded near the first radial location. The head is positioned over a second radial location, and a second data tracks per inch (TPI_2) is selected for data tracks recorded near the second radial location. The head is positioned over a third radial location, and a third data tracks per inch (TPI_3) is selected for data tracks recorded near the third radial location. A geometry of the head is estimated in response to TPI_1, TPI_2 and TPI_3.

10 Claims, 6 Drawing Sheets

U.S. PATENT DOCUMENTS

| | | |
|---|---|---|
| 7,012,773 B2 | 3/2006 | Ashikaga et al. |
| 7,046,471 B2 | 5/2006 | Meyer et al. |
| 7,110,197 B2 | 9/2006 | Cho |
| 7,113,358 B2 | 9/2006 | Zayas et al. |
| 7,145,740 B2 | 12/2006 | Zayas et al. |
| 7,170,700 B1 | 1/2007 | Lin et al. |
| 7,215,514 B1 | 5/2007 | Yang et al. |
| 7,436,610 B1 | 10/2008 | Thelin |
| 2002/0039246 A1 | 4/2002 | Ding et al. |
| 2004/0136104 A1 | 7/2004 | Chiao et al. |
| 2004/0179292 A1 | 9/2004 | Zayas et al. |
| 2006/0164747 A1* | 7/2006 | Lee .............................. 360/69 |
| 2006/0227445 A1 | 10/2006 | Chiao et al. |
| 2007/0064325 A1 | 3/2007 | Bi et al. |
| 2007/0127150 A1 | 6/2007 | Cho et al. |
| 2007/0183077 A1* | 8/2007 | Nakamura et al. ............ 360/75 |

* cited by examiner

DISK DRIVE SELECTING TPI PROFILE BY ESTIMATING HEAD GEOMETRY

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric data tracks for recording user data sectors and servo sectors. The servo sectors comprise head positioning information (e.g., a track address) which is read by the head and processed by a servo control system to control the velocity of the actuator arm as it seeks from track to track.

Figure 1:
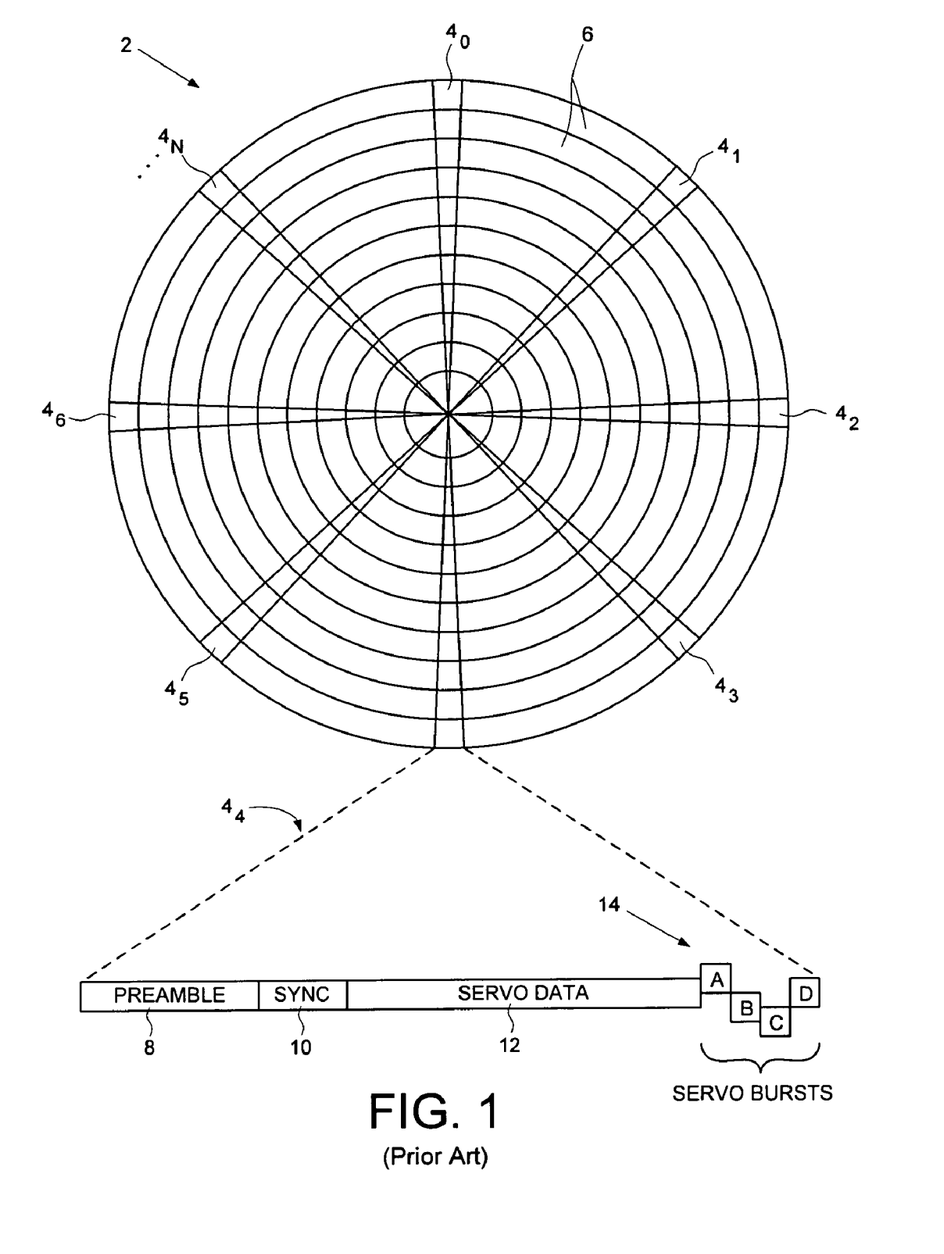
FIG. 1 shows a prior art disk format comprising a plurality of servo tracks defined by embedded servo sectors.

FIG. 1 shows a prior art disk format 2 comprising a number of servo sectors $4_0$-$4_N$ recorded around the circumference of the disk which define a plurality of servo tracks 6. Each servo sector $4_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector $4_i$ may further comprise groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

Figure 2A:
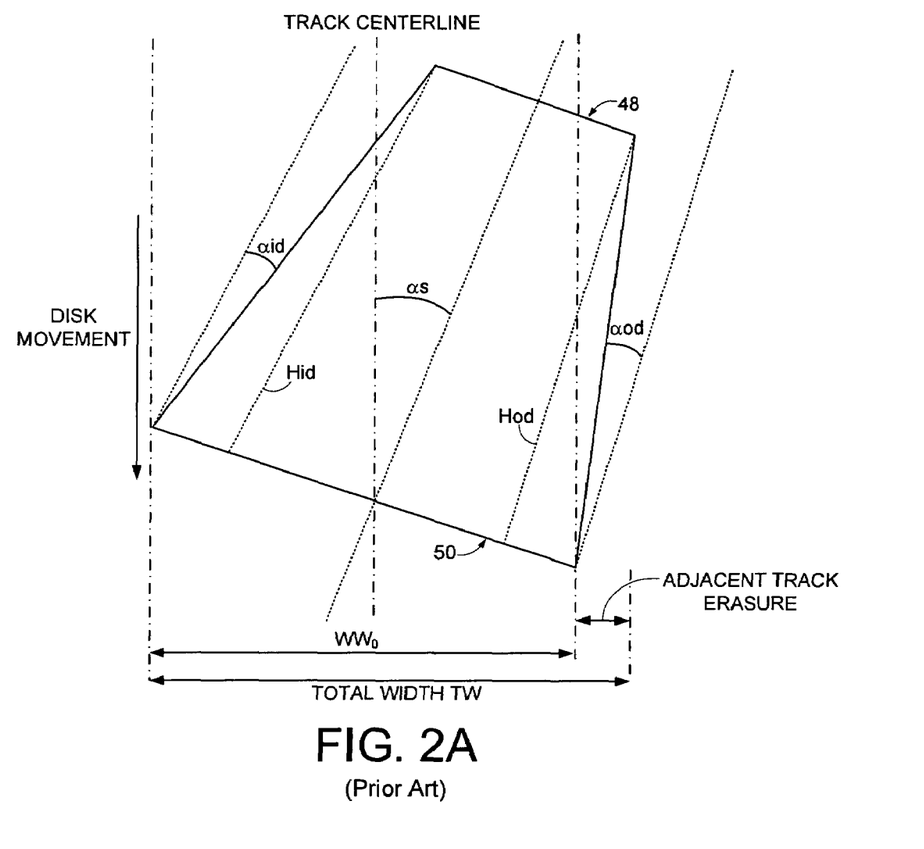
FIG. 2A shows an example prior art write element comprising inner and outer bevel angles and pole heights.
Figure 2B:
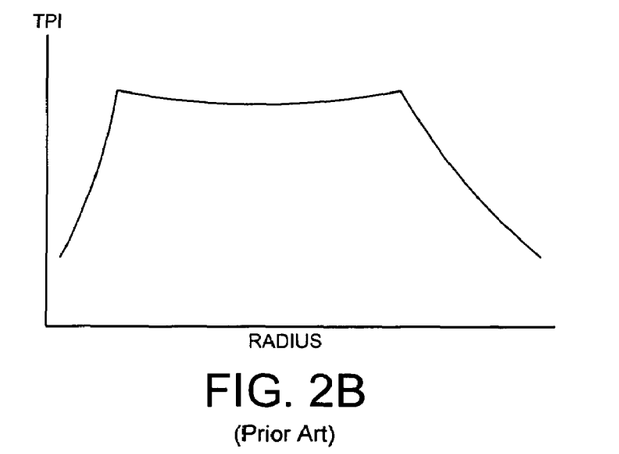
FIG. 2B shows a prior art technique of adjusting the TPI across the radius of the disk to account for the head skew angle.

The geometry of the write element of the head may impact the ability to reliably recover written data, particularly toward the outer and inner diameter of the disk where the head skew angle increases. For example, in disk drives employing perpendicular magnetic recording, the width of the magnetic footprint generated by the write element may increase due to the head skew angle. This is illustrated in FIG. 2A which shows that the total write width (TW) increases beyond the width ($WW_0$) of the write element due to the head skew angle αs exceeding the bevel angle αod. In order to reduce the amount of adjacent track erasure, the data tracks per inch (TPI) is typically adjusted across the radius of the disk as shown in FIG. 2B so that the track width of the data tracks is increased toward the outer and inner diameter of the disk. However, selecting the optimal TPI that minimizes adjacent track erasure while achieving a desirably high radial density depends on the actual geometry of the write element.

There is, therefore, a need to estimate the head geometry in a disk drive, and to use the estimated head geometry to select a TPI across the radius of the disk.

DETAILED DESCRIPTION OF EMBODIMENTS OF THE INVENTION

Figures 3A, 3B:
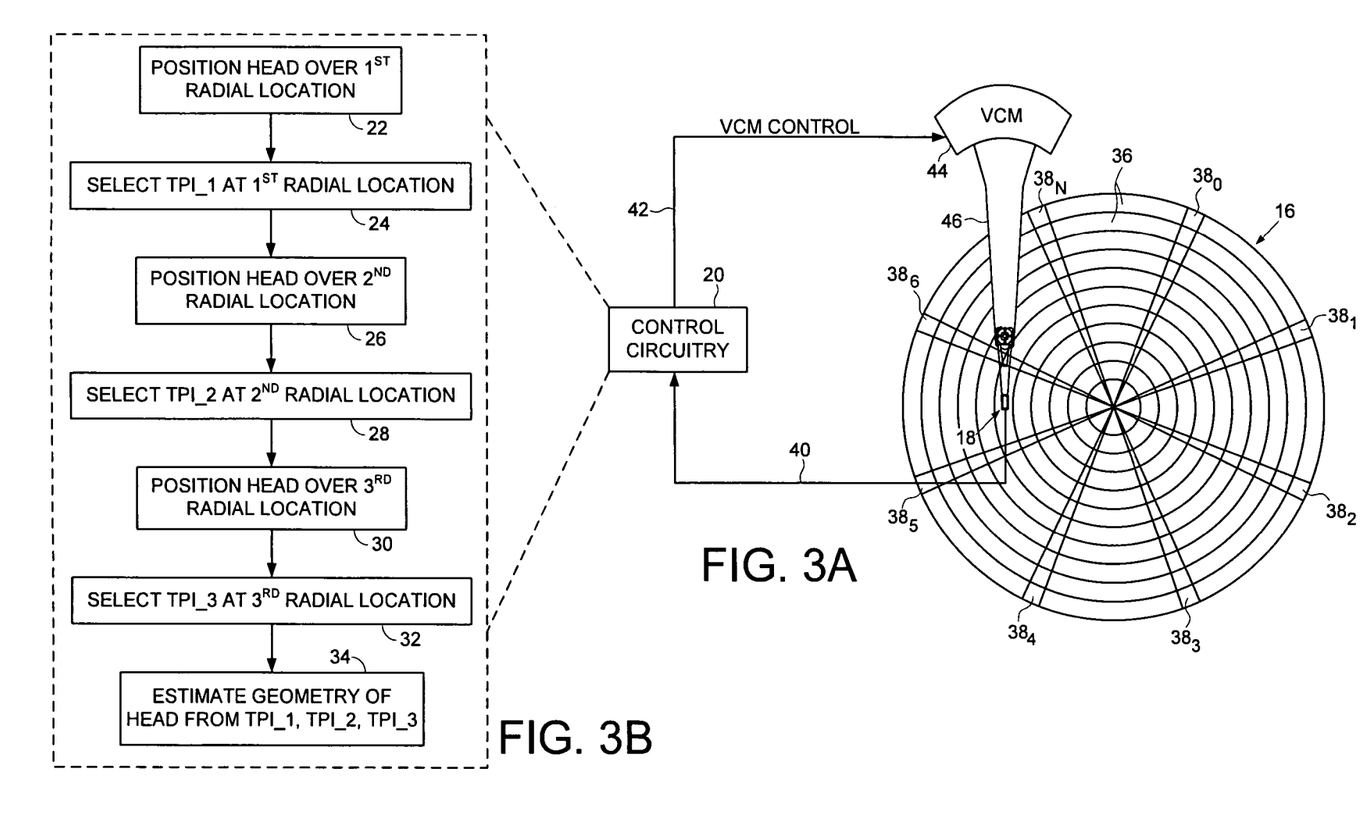
FIG. 3A shows a disk drive according to an embodiment of the present invention comprising a disk, a head actuated radially over the disk, and control circuitry.
FIG. 3B is a flow diagram executed by the control circuitry according to an embodiment of the present invention wherein a geometry of the head is estimated by selecting a TPI for at least three radial locations of the disk.

FIG. 3A shows a disk drive according to an embodiment of the present invention comprising a disk 16, a head 18 actuated radially over the disk 16, and control circuitry 20 for executing the flow diagram of FIG. 3B in order to estimate a geometry of the head 18. The head 18 is positioned over a first radial location (step 22), and a first data tracks per inch (TPI_1) is selected for data tracks recorded near the first radial location (step 24). The head is positioned over a second radial location (step 26), and a second data tracks per inch (TPI_2) is selected for data tracks recorded near the second radial location (step 28). The head is positioned over a third radial location (step 30), and a third data tracks per inch (TPI_3) is selected for data tracks recorded near the third radial location (step 32). A geometry of the head is estimated in response to TPI_1, TPI_2 and TPI_3 (step 34).

In the embodiment of FIG. 3A, the disk 16 comprises a plurality of servo tracks 36 defined by a plurality of embedded servo sectors $38_0$-$38_N$. The control circuitry 20 processes the read signal 40 emanating from the head 18 to demodulate the embedded servo sectors $38_0$-$38_N$ and generate a position error signal (PES) representing a radial offset of the head 18 from a target data track. The control circuitry 20 processes the PES with a suitable servo compensator to generate a control signal 42 applied to a voice coil motor (VCM) 44. The VCM 44 rotates an actuator arm 46 about a pivot in order to actuate the head 18 radially over the disk 16 in a direction that decreases the PES.

The TPI of the data tracks differs from the TPI of the servo tracks over at least part of the disk surface. The centerline of each data track is defined relative to the servo tracks 36, for example, relative to an offset from the centerline of each servo track 36, wherein the offset is adjusted in order to adjust the TPI of the data tracks. In one embodiment, once a data track TPI has been selected for a region of the disk (e.g., a predetermined number of data tracks), the servo algorithm is adjusted accordingly so that the centerline of the data tracks can be located during write and read operations.

Any suitable head may be employed in the embodiments of the present invention. In one embodiment, the head comprises a magnetoresistive (MR) read element, and a perpendicular magnetic recording (PMR) write element as shown in the example of FIG. 2A. In FIG. 2A, the head 18 is positioned near an outer diameter of the disk 16 (FIG. 3A) which causes the data track to move under the head 18 from a leading edge 48 of the write element toward a trailing edge 50 of the write element. When the head skew angle αs exceeds the outer diameter bevel angle αod (as shown in FIG. 2A), the leading edge 48 of the write element may "swing out" causing adjacent track erasure of the adjacent data track (toward the inner diameter of the disk as illustrated in FIG. 2A). Similarly, when the head 18 is positioned near an inner diameter of the disk 16 such that the head skew angle αs exceeds the inner diameter bevel angle αid, a similar adjacent track erasure may occur. The degree of adjacent track erasure may also be a function of the pole heights Hod and Hid, that is, the longer the pole height (Hod or Hid), the more adjacent track erasure. The optimal data track TPI may also be a function of the width $WW_0$ of the trailing edge 50 of the write element which determines the width of the magnetic footprint at zero head skew angle. By estimating the geometry of the head 18 ($WW_0$, αod, Hod, αid, and Hid), an optimal data track TPI may be selected across the radius of the disk 16 to reduce adjacent track erasure. The geometry of the head may be used for other purposes as well.

In the above description of FIG. 2A, the head skew angle αs is considered a positive number even though the angle passes through zero near the middle diameter of the disk. One of skill in the art will recognize that a negative head skew angle may be used in other embodiments. In addition, the geometry of an actual PMR write element may vary significantly from the example shown in FIG. 2A, and in other embodiments, a write element other than PMR having a completely different geometry may be employed.

Figure 4:
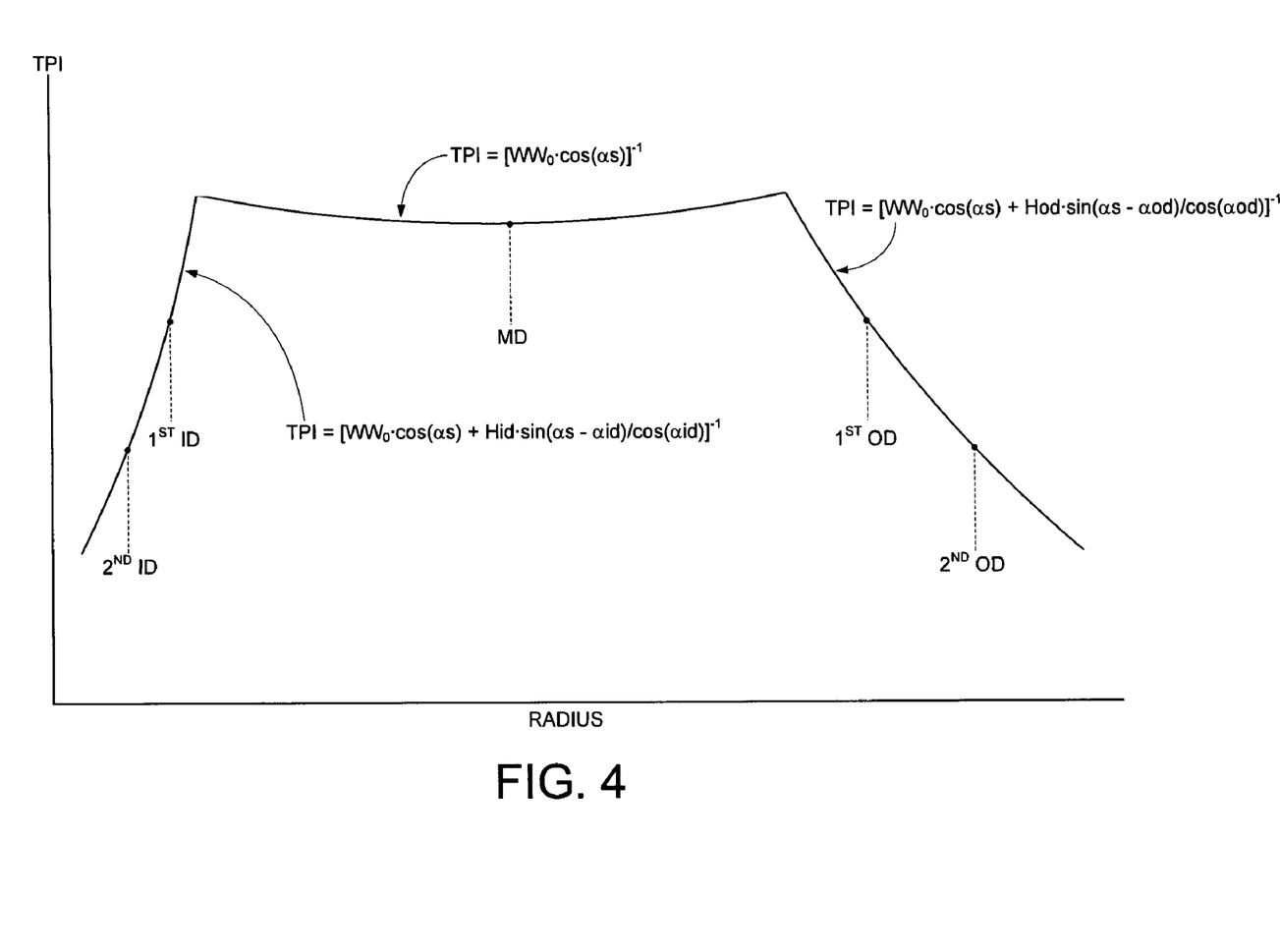
FIG. 4 illustrates two variable equations for solving the bevel angle and pole height at an inner edge and an outer edge of the head.

In one embodiment, the geometry of the head 18 and corresponding optimal TPI can be determined mathematically using the equations shown in FIG. 4. Therefore, in one embodiment an algorithm is employed to select an optimal TPI for at least three radial locations (three known head skew angles αs), and then the geometry of the head is estimated in response to the selected TPIs using the equations shown in FIG. 4. First the width of the write element ($WW_0$) is estimated by positioning the head 18 near a middle diameter of the disk (at a first head skew angle $αs_1$) and executing a bit error rate test to select a corresponding TPI_1. The selected TPI_1 is then used to solve for the write width $WW_0$ according to:

$$WW_0 = 1/(TPI\_1 \cdot \cos αs_1).$$

In one embodiment, the first head skew angle $αs_1$ is zero, such that the write width $WW_0$ is solved according to:

$$WW_0 = 1/TPI\_1.$$

The head 18 is then placed at a second radial location (e.g., near an outer diameter of the disk 16), and the bit error rate test executed to select a corresponding TPI_2. The head 18 is then placed at a second radial location (e.g., near an outer diameter of the disk 16), and the bit error rate test executed to select a corresponding TPI_3. The selected TPI_2 and TPI_3 together with the estimated write width $WW_0$ are then used to solve the two variable equation shown in FIG. 4 to estimate the corresponding pole height H and bevel angle α. Once the parameters for the head geometry have been estimated in the equation of FIG. 4, an optimal TPI is then selected across the radius of the disk at any suitable resolution, such as every track or every N tracks.

In one embodiment, the geometry of only one edge of the head 18 is estimated, for example, the pole height Hod and bevel angle αod corresponding to the inner edge of the head 18 as shown in FIG. 2A. In one embodiment, the geometry for the second edge of the head 18 may be chosen as symmetric to the first edge of the head 18. In another embodiment, a nominal setting determined for a family of disk drives may be assigned to a first edge of the head 18 (e.g., the outer edge) while the geometry for the second edge (e.g., the inner edge) may be estimated as described above.

Figure 5:
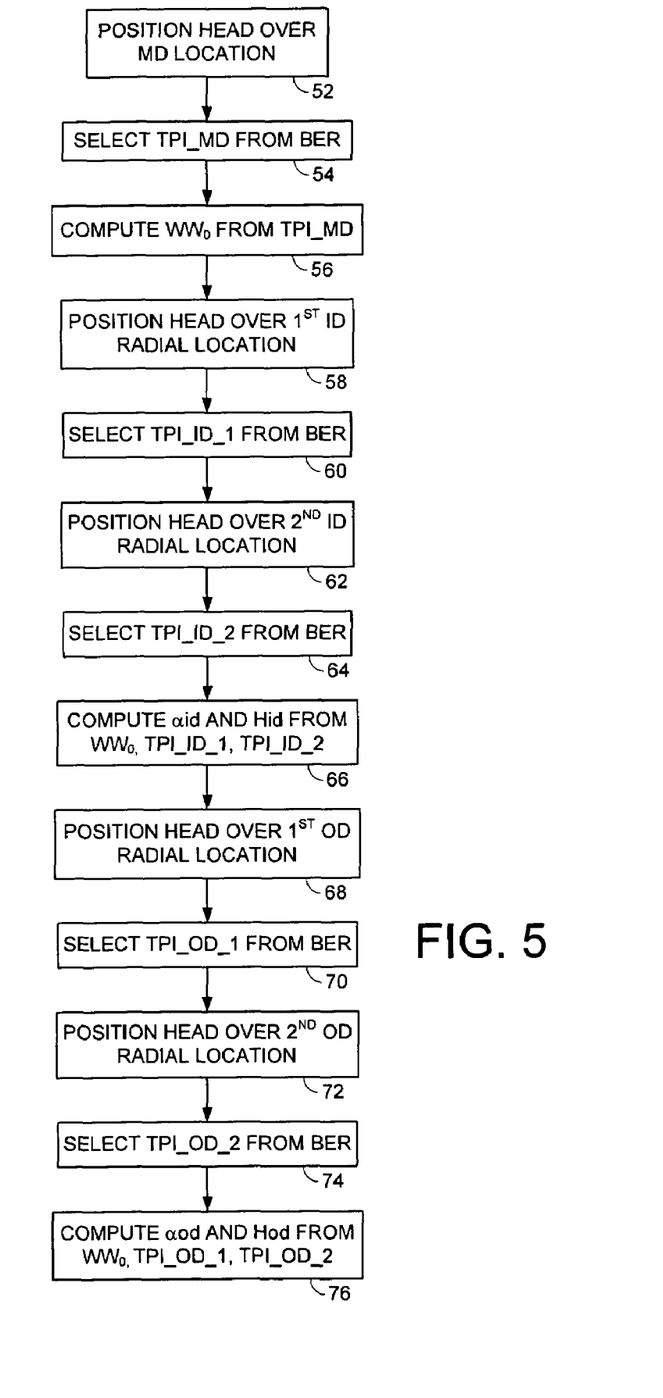
FIG. 5 is a flow diagram according to an embodiment of the present invention wherein a bevel angle and pole height of the head are estimated by solving a two variable equation in response to the TPI settings.

In yet another embodiment, the geometry is estimated as described above for both the inner and outer edge of the head 18. This embodiment is understood with reference to the flow diagram of FIG. 5 wherein the head is positioned near a middle diameter of the disk (step 52), and a corresponding TPI_MD is selected (step 54) using any suitable calibration technique (such as a suitable bit error rate test). The write width $WW_0$ is then estimated (step 56) as described above. The head is then positioned over a first inner diameter location (step 58) and a corresponding TPI_ID_1 selected (step 60). The head is then positioned over a second inner diameter location (step 62) and a corresponding TPI_ID_2 selected (step 64). The two variable equation of FIG. 4 is then solved using $WW_0$, TPI_MD, TPI_ID_1 and TPI_ID_2 in order to compute the pole height Hid and the bevel angle αid (step 66). The head is then positioned over a first outer diameter location (step 68) and a corresponding TPI_OD_1 selected (step 70). The head is then positioned over a second outer diameter location (step 72) and a corresponding TPI_OD_2 selected (step 74). The two variable equation of FIG. 4 is then solved using $WW_0$, TPI_MD, TPI_OD_1 and TPI_OD_2 in order to compute the pole height Hod and the bevel angle αod (step 76). The steps outlined above may also be performed in other orders.

Once the geometry of the head 18 has been estimated, the estimated parameters can be used to select an optimal TPI across the radius of the disk in any suitable manner. In one embodiment, the TPI for each data track (or region) may be selected using the equations shown in FIG. 4 together with the head skew angle that corresponds to the radial location of the data track (or region). In this manner, a unique TPI profile is computed corresponding to the geometry of the head 18 within each disk drive. In an alternative embodiment, the control circuitry 20 stores a plurality of TPI profiles in a multi-dimensional lookup table, wherein each TPI profile corresponds to a range for each head geometry parameter. In this embodiment, the estimated head geometry parameters $WW_0$, α, and H are used to index the lookup table in order to select the appropriate TPI profile for the disk surface.

Figure 6:
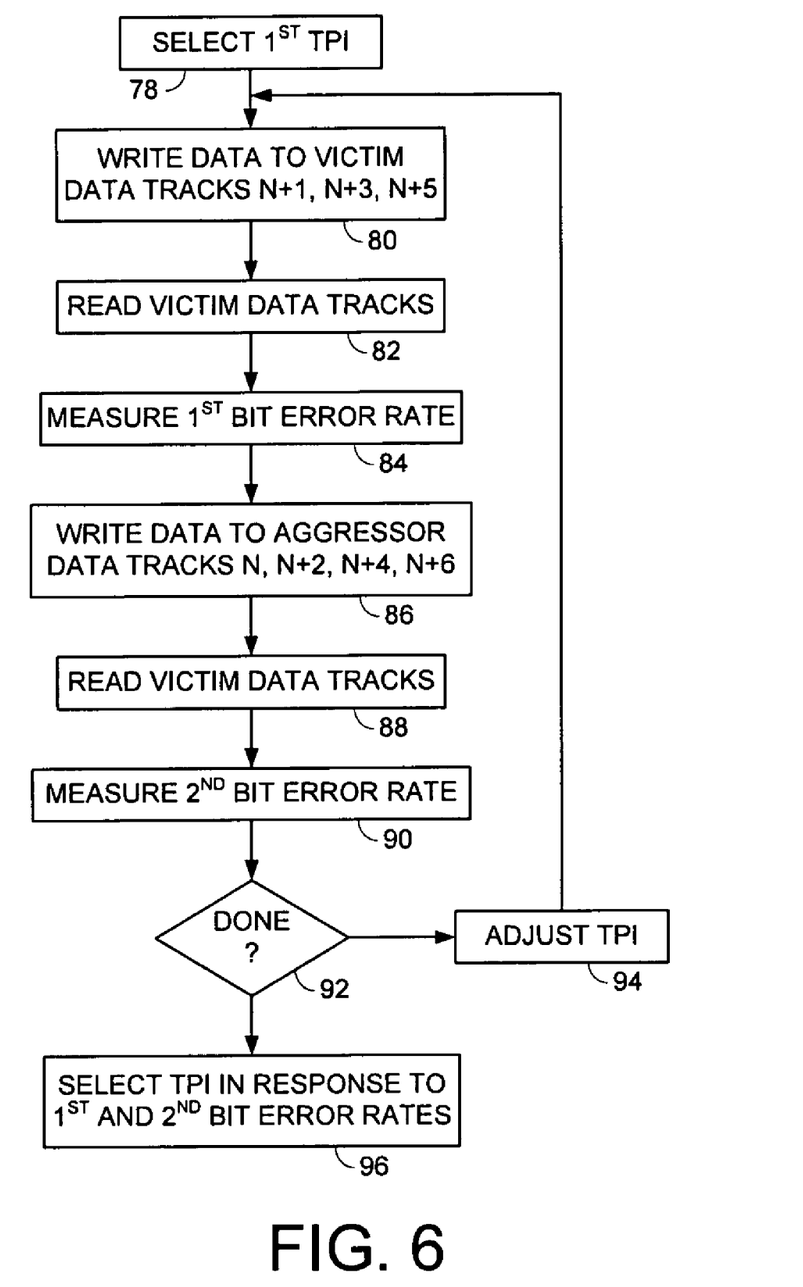
FIG. 6 is a flow diagram for selecting the TPI in response to a bit error rate test performed at the various radial locations according to an embodiment of the present invention.

Any suitable calibration algorithm may be employed in the embodiments of the present invention for selecting the TPIs at the various radial locations (the TPIs for estimating the head geometry). For example, FIG. 6 is a flow diagram executed by the control circuitry 20 according to an embodiment of the present invention for selecting a TPI at a given radial location. A first TPI setting is selected (step 78) and data is written to a plurality of victim data tracks (step 80), wherein each victim data track is separated by at least one aggressor data track. The victim data tracks are read (step 82) and a first bit error rate of the victim data tracks is measured (step 84). Data is written to the aggressor data tracks (step 86) and the victim data tracks are read (step 88) to measure a second bit error rate (step 90). If more TPI setting are to be tested (step 92), then the TPI is adjusted (step 94) and the process repeats. After testing a number of TPI settings, a TPI is selected in response to the first and second bit error rates (step 96). For example, the TPI may be selected relative to the difference between the first and second bit error rates, for example, the TPI may be selected that results in the difference exceeding a predetermined threshold.

In one embodiment, the aggressor data tracks are written a number of times (step 86) in order to simulate the effect of adjacent track erasure that might occur during normal operation of the disk drive. In another embodiment, one or more parameters may be adjusted to enhance adjacent track erasure when writing data to the aggressor data tracks, such as decreasing the fly height of the head, introducing a squeeze percentage which simulates track misregistration, or increasing the write current applied to the write element.

Any suitable control circuitry 20 may be employed in the embodiments of the present invention, such as any suitable integrated circuit or circuits. For example, the control circuitry 20 may be implemented within a read channel integrated circuit, or in a component separate from the read channel, such as a disk controller, or certain steps described above may be performed by a read channel and others by a disk controller.

In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry 20 comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk 16 and read into a volatile semiconductor memory when the disk drive is powered on. In yet another embodiment, the control circuitry 20 comprises suitable logic circuitry, such as state machine circuitry.

What is claimed is:

1. A disk drive comprising:
   a disk;
   a head actuated radially over the disk; and
   control circuitry operable to:
      position the head over a first radial location;
      select a first data tracks per inch (TPI_1) for data tracks recorded near the first radial location;
      position the head over a second radial location;
      select a second data tracks per inch (TPI_2) for data tracks recorded near the second radial location;
      position the head over a third radial location;
      select a third data tracks per inch (TPI_3) for data tracks recorded near the third radial location; and
      estimate a geometry of the head in response to TPI_1, TPI_2 and TPI_3,
   wherein:
      the first radial location is near a middle diameter of the disk;
      the second and third radial locations are near one of an inner diameter of the disk and an outer diameter of the disk;
      the head comprises a write width $WW_0$ estimated according to $1/(TPI\_1 \cdot \cos \alpha s_1)$, where $\alpha s_1$ is a head skew angle at the first radial location;
      the head further comprises a bevel angle $\alpha$ and a pole height H;
      the bevel angle $\alpha$ and the pole height H are estimated according to a two variable equation:

$$TPI\_2 = [WW_0 \cdot \cos \cdot (\alpha s_2) + H \cdot \sin(\alpha s_2 - \alpha)/\cos(\alpha)]^{-1}$$

$$TPI\_3 = [WW_0 \cdot \cos \cdot (\alpha s_3) + H \cdot \sin(\alpha s_3 - \alpha)/\cos(\alpha)]^{-1}$$

where:
   $\alpha s_2$ is a head skew angle at the second radial location;
   $\alpha s_3$ is a head skew angle at the third radial location; and
   $\alpha$ and H are computed by solving the two variable equation in response to TPI_2 and TPI_3.

2. The disk drive as recited in claim 1, wherein:
   the head further comprises a bevel angle $\alpha od$ and a pole height Hod corresponding to an inner edge of the head;
   the bevel angle $\alpha od$ and the pole height Hod are estimated according to a two variable equation:

$$TPI\_2 = [WW_0 \cdot \cos \cdot (\alpha s_2) + Hod \cdot \sin(\alpha s_2 - \alpha od)/\cos(\alpha od)]^{-1}$$

$$TPI\_3 = [WW_0 \cdot \cos \cdot (\alpha s_3) + Hod \cdot \sin(\alpha s_3 - \alpha od)/\cos(\alpha od)]^{-1}$$

where:
   $\alpha s_2$ is a head skew angle at the second radial location;
   $\alpha s_3$ is a head skew angle at the third radial location; and
   $\alpha od$ and Hod are computed by solving the two variable equation in response to TPI_2 and TPI_3.

3. The disk drive as recited in claim 1, wherein:
   the head further comprises a bevel angle $\alpha id$ and a pole height Hid corresponding to an outer edge of the head;
   the bevel angle $\alpha id$ and the pole height Hid are estimated according to a two variable equation:

$$TPI\_2 = [WW_0 \cdot \cos \cdot (\alpha s_2) + Hid \cdot \sin(\alpha s_2 - \alpha id)/\cos(\alpha id)]^{-1}$$

$$TPI\_3 = [WW_0 \cdot \cos \cdot (\alpha s_3) + Hid \cdot \sin(\alpha s_3 - \alpha id)/\cos(\alpha id)]^{-1}$$

where:
   $\alpha s_2$ is a head skew angle at the second radial location;
   $\alpha s_3$ is a head skew angle at the third radial location; and
   $\alpha id$ and Hid are computed by solving the two variable equation in response to TPI_2 and TPI_3.

4. The disk drive as recited in claim 1, wherein the control circuitry is further operable to select a TPI profile across the radius of the disk in response to the estimated geometry of the head.

5. A disk drive comprising:
   a disk;
   a head actuated radially over the disk; and
   control circuitry operable to:
      position the head over a first radial location;
      select a first data tracks per inch (TPI_1) for data tracks recorded near the first radial location;
      position the head over a second radial location;
      select a second data tracks per inch (TPI_2) for data tracks recorded near the second radial location;
      position the head over a third radial location;
      select a third data tracks per inch (TPI_3) for data tracks recorded near the third radial location;
      estimate a geometry of the head in response to TPI_1, TPI_2, and TPI_3; and
      select at least one of TPI_1, TPI_2 and TPI_3 by:
         writing data to a plurality of victim data tracks, wherein each victim data track is separated by at least one aggressor data track;
         reading the victim data tracks and measure a first bit error rate of the victim data tracks;
         writing data to the aggressor data tracks; and
         reading the victim data tracks and measure a second bit error rate of the victim data tracks.

6. A method of estimating a geometry of a head in a disk drive, the disk drive comprising a disk, and the head actuated over the disk, the method comprising:
   positioning the head over a first radial location;
   selecting a first data tracks per inch (TPI_1) for data tracks recorded near the first radial location;

positioning the head over a second radial location;
selecting a second data tracks per inch (TPI_2) for data tracks recorded near the second radial location;
positioning the head over a third radial location;
selecting a third data tracks per inch (TPI_3) for data tracks recorded near the third radial location; and
estimating the geometry of the head in response to TPI_1, TPI_2 and TPI_3,
wherein:
  the first radial location is near a middle diameter of the disk;
  the second and third radial locations are near one of an inner diameter of the disk and an outer diameter of the disk;
  the head comprises a write width $WW_0$ estimated according to $1/(TPI\_1 \cdot \cos \alpha s_1)$, where $\alpha s_1$ is a head skew angle at the first radial location;
  the head further comprises a bevel angle $\alpha$ and a pole height H;
  the bevel angle $\alpha$ and the pole height H are estimated according to a two variable equation:

$$TPI\_2 = [WW_0 \cdot \cos(\alpha s_2) + H \cdot \sin(\alpha s_2 - a)/\cos(\alpha)]^{-1}$$

$$TPI\_3 = [WW_0 \cdot \cos(\alpha s_3) + H \cdot \sin(\alpha s_3 - \alpha)/\cos(\alpha)]^{-1}$$

where:
    $\alpha s_2$ is a head skew angle at the second radial location;
    $\alpha s_3$ is a head skew angle at the third radial location; and
    $\alpha$ and H are computed by solving the two variable equation in response to TPI_2 and TPI_3.

7. The method as recited in claim 6, wherein:
the head further comprises a bevel angle $\alpha od$ and a pole height Hod corresponding to an inner edge of the head;
the bevel angle $\alpha od$ and the pole height Hod are estimated according to a two variable equation:

$$TPI\_2 = [WW_0 \cdot \cos(\alpha s_2) + Hod \cdot \sin(\alpha s_2 - aod)/\cos(\alpha od)]^{-1}$$

$$TPI\_3 = [WW_0 \cdot \cos(\alpha s_3) + Hod \cdot \sin(\alpha s_3 - aod)/\cos(\alpha od)]^{-1}$$

where:
  $\alpha s_2$ is a head skew angle at the second radial location;
  $\alpha s_3$ is a head skew angle at the third radial location; and
  $\alpha od$ and Hod are computed by solving the two variable equation in response to TPI_2 and TPI_3.

8. The method as recited in claim 6, wherein:
the head further comprises a bevel angle $\alpha id$ and a pole height Hid corresponding to an outer edge of the head;
the bevel angle $\alpha id$ and the pole height Hid are estimated according to a two variable equation:

$$TPI\_2 = [WW_0 \cdot \cos(\alpha s_2) + Hid \cdot \sin(\alpha s_2 - \alpha id)/\cos(\alpha id)]^{-1}$$

$$TPI\_3 = [WW_0 \cdot \cos(\alpha s_3) + Hid \cdot \sin(\alpha s_3 - \alpha id)/\cos(\alpha id)]^{-1}$$

where:
  $\alpha s_2$ is a head skew angle at the second radial location;
  $\alpha s_3$ is a head skew angle at the third radial location; and
  $\alpha id$ and Hid are computed by solving the two variable equation in response to TPI_2 and TPI_3.

9. The method as recited in claim 6, further comprising selecting a TPI profile across the radius of the disk in response to the estimated geometry of the head.

10. A method of estimating a geometry of a head in a disk drive, the disk drive comprising a disk, and the head actuated over the disk, the method comprising:
positioning the head over a first radial location;
selecting a first data tracks per inch (TPI_1) for data tracks recorded near the first radial location;
positioning the head over a second radial location;
selecting a second data tracks per inch (TPI_2) for data tracks recorded near the second radial location;
positioning the head over a third radial location;
selecting a third data tracks per inch (TPI_3) for data tracks recorded near the third radial location; and
estimating the geometry of the head in response to TPI_1, TPI_2 and TPI_3,
wherein:
  the first radial location is near a middle diameter of the disk;
  the second and third radial locations are near one of an inner diameter of the disk and an outer diameter of the disk; and
  selecting at least one of TPI_1, TPI_2 and TPI_3 comprises:
    writing data to a plurality of victim data tracks, wherein each victim data track is separated by at least one aggressor data track;
    reading the victim data tracks and measure a first bit error rate of the victim data tracks;
    writing data to the aggressor data tracks; and
    reading the victim data tracks and measure a second bit error rate of the victim data tracks.

\* \* \* \* \*